United States Patent
Björn

(10) Patent No.: US 10,031,527 B2
(45) Date of Patent: Jul. 24, 2018

(54) OBSTACLE DETECTION FOR A ROBOTIC WORKING TOOL

(71) Applicant: HUSQVARNA AB, Huskvarna (SE)

(72) Inventor: Jonathan Björn, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 9 days.

(21) Appl. No.: 15/116,238

(22) PCT Filed: Feb. 3, 2014

(86) PCT No.: PCT/SE2014/050132
§ 371 (c)(1),
(2) Date: Aug. 3, 2016

(87) PCT Pub. No.: WO2015/115954
PCT Pub. Date: Aug. 6, 2015

(65) Prior Publication Data
US 2017/0168499 A1    Jun. 15, 2017

(51) Int. Cl.
*G05D 1/02* (2006.01)
*A01D 34/08* (2006.01)
*G05D 1/00* (2006.01)

(52) U.S. Cl.
CPC .......... *G05D 1/0265* (2013.01); *A01D 34/08* (2013.01); *G05D 1/0033* (2013.01);
(Continued)

(58) Field of Classification Search
CPC .. G05D 1/0265; G05D 1/0033; G05D 1/0227; G05D 1/0038; G05D 2201/0208; A01D 34/08
See application file for complete search history.

(56) References Cited

U.S. PATENT DOCUMENTS

| | | |
|---|---|---|
| 4,866,854 A | 9/1989 | Seltzer |
| 6,650,975 B2 | 11/2003 | Ruffner |

(Continued)

FOREIGN PATENT DOCUMENTS

| | | |
|---|---|---|
| DE | 3814582 A1 | 11/1988 |
| DE | 202012102637 U1 | 10/2013 |

(Continued)

OTHER PUBLICATIONS

International Search Report and Written Opinion for International Application No. PCT/SE2014/050132 dated Dec. 12, 2014, all enclosed pages cited.

*Primary Examiner* — Ian Jen
(74) *Attorney, Agent, or Firm* — McNair Law Firm, P.A.

(57) ABSTRACT

A robotic work tool system (200) comprising a robotic work tool (100) comprising a collision detection sensor (190), said collision detection sensor (190) comprising a first sensor element (191) and a plurality of second sensor elements (192), wherein said first sensor element (191) is movably arranged with respect to said plurality of second sensor elements (192), wherein said robotic work tool (100) is configured to detect that said first sensor element (191) is proximate a peripheral second sensor element (192) and in response thereto determine that a collision has been detected, and detect that said first sensor element (191) is not proximate any peripheral second sensor element (192) and in response thereto determine that a lift has been detected.

13 Claims, 2 Drawing Sheets

(52) U.S. Cl.
    CPC ......... *G05D 1/0038* (2013.01); *G05D 1/0227* (2013.01); *G05D 2201/0208* (2013.01)

(56) References Cited

U.S. PATENT DOCUMENTS

| | | | | |
|---|---|---|---|---|
| 7,187,998 | B2* | 3/2007 | Okamoto | B25J 5/007 |
| | | | | 318/568.12 |
| 7,626,569 | B2* | 12/2009 | Lanier | G06F 1/1601 |
| | | | | 345/156 |
| 7,720,572 | B2* | 5/2010 | Ziegler | B25J 5/007 |
| | | | | 700/245 |
| 9,643,316 | B2* | 5/2017 | Krasny | B25J 9/1666 |
| 2015/0045948 | A1* | 2/2015 | Bjorn | H01H 27/00 |
| | | | | 700/245 |
| 2017/0042085 | A1* | 2/2017 | Bjorn | A01D 34/008 |
| 2017/0129297 | A1* | 5/2017 | Bjorn | B60G 9/02 |
| 2017/0168499 | A1* | 6/2017 | Bjorn | G05D 1/0265 |

FOREIGN PATENT DOCUMENTS

| | | | |
|---|---|---|---|
| EP | 270322 | A2 | 6/1988 |
| EP | 2425700 | A2 | 3/2012 |
| EP | 2692220 | A1 | 2/2014 |
| EP | 2803255 | A1 | 11/2014 |
| WO | 0106905 | A1 | 2/2001 |
| WO | 03103305 | A1 | 12/2003 |
| WO | 03103375 | A1 | 12/2003 |

\* cited by examiner

OBSTACLE DETECTION FOR A ROBOTIC WORKING TOOL

TECHNICAL FIELD

This application relates to a method and a robotic work tool system for an improved detection of collisions and lifting of a robotic work tool, and in particular to a method and a robotic work tool for improved differentiation between detecting a collision and detecting a lifting of the robotic work tool.

BACKGROUND

Contemporary robotic work tools are designed to operate in areas with obstacles, permanent and temporary. One example being a garden with a fountain in it. The fountain may not be marked with a boundary marker and the robotic work tool should be able to detect that it has collided with the obstacle so that it can continue to operate in another direction instead of coming to a standstill while pushing against the fountain. The collision detection thus influence an operating pattern of the robotic work tool and affects the ongoing operation (such as through a change in direction), but does not discontinue the operation.

Furthermore, many robotic work tools, such as lawnmower robots, carry work tools, such as cutting blades, that may injure or cause damage if not handled properly. A common problematic situation occurs when a user lifts a robotic work tool to move it from one area to another, or perhaps just to change direction, when the user may become exposed to the work tool. It is thus of importance for safety reasons that the robotic work tool is able to detect that it is being lifted, also for partial lifts, and at least temporarily deactivate any work tool. The lift detection thus, at least temporarily interrupts the operation of the robotic work tool and it is important to distinguish between these two detections.

For these reasons many robotic work tools are arranged with both collision detection sensors and lift detectors. Having two sensors for each action results in that an robotic work tool needs to have many detectors especially to be able to detect collisions in all directions and also to detect partial lifts in different parts or corners of an robotic work tool.

One manner of detecting collisions is disclosed in the international patent application published as WO 03/103375. The application discloses a self-propelling device, preferably a self-propelling lawn-mowing robot comprising at least a control and navigational control system that in conjunction with outer influence on the device, for instance collision with an object, at least by information from one or several sensors placed in or on the device, controls the movements of the device across a surface area. The device is designed so that at least a first part of the device moves in relation to the device's remaining parts in conjunction with the outer influence. The device is so designed that the first part of the device moves in relation to the device's remaining parts in conjunction with outer influence. The self-propelling robot comprises a sensor that detects the movements of the first part without being in contact with the first part. Two main embodiments are disclosed with reference to (mainly) FIGS. 11 and 13. The first embodiment (FIG. 11) is directed at detecting collisions as is clearly stated on page 6, line 11. The second embodiment (FIG. 13) is directed at detecting lifts (or crossing a hollow) as is clearly stated on page 7, lines 10-12. In the first embodiment the sensor arrangement is arranged close to the rear wheels. In the second embodiment the sensor arrangement is arranged close to the front wheels (compare with FIG. 10 for location of components). Thus, the disclosure teaches to use one setup to detect a collision and one setup to detect a lift/crossing a hollow. These two embodiments would not be possible to combine without significant modification.

Even though the problems above have been discussed for lawnmower robotic work tools, the same or similar problems exist also for other robotic work tools.

There is thus a need for a manner of detecting both collisions and lifts without requiring too many sensors.

SUMMARY

It is an object of the teachings of this application to overcome the problems listed above by providing a robotic work tool system comprising a robotic work tool comprising a collision detection sensor, said collision detection sensor comprising a first sensor element and a plurality of second sensor elements, wherein said first sensor element is movably arranged with respect to said plurality of second sensor elements, wherein said robotic work tool is configured to detect that said first sensor element is proximate a peripheral second sensor element and in response thereto determine that a collision has been detected, and detect that said first sensor element is not proximate any peripheral second sensor element and in response thereto determine that a lift has been detected.

In one embodiment the robotic work tool is a farming equipment, a vacuum cleaner, a floor cleaner, a street sweeper, a snow removal tool, a golf ball retriever robot, a cleaner robot, a leaves blower robot, a leaves collector robot, snow thrower robot or a mine clearance robot.

It is also an object of the teachings of this application to overcome the problems listed above by providing a method for use in a robotic work tool system comprising a robotic work tool comprising a collision detection sensor, said collision detection sensor comprising a first sensor element and a plurality of second sensor elements, wherein said first sensor element is movably arranged with respect to said plurality of second sensor elements, wherein said method comprises detecting that said first sensor element is proximate a peripheral second sensor element and in response thereto determining that a collision has been detected, and detecting that said first sensor element is not proximate any peripheral second sensor element and in response thereto determining that a lift has been detected.

The inventors of the present invention have realized, after inventive and insightful reasoning that by arranging an array of for example Hall sensors in one part of the robotic work tool, such as the chassis, and a magnet in another part of the robotic work tool, such as the body, it is possible to detect how the magnet moves in relation to the array of sensors, and based on this determine whether a collision or a lift has been detected by using only one collision detection sensor, only having one magnet.

One benefit is that the assembly time and cost for manufacturing, and also maintaining, a robotic work tool is reduced by integrating many sensor arrangements into one sensor for detecting both collisions and lifts.

A further benefit lies in that the robotic work tool can determine from which side a collision occurs. This would not be possible using the arrangements of the WO 03/103305 disclosure as a side collision would cause all collision detecting magnets to move away from their respective sensors.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
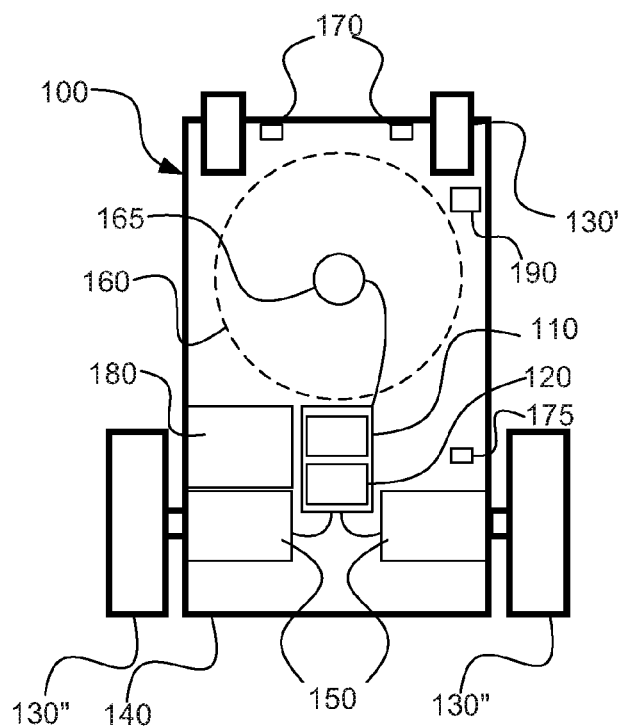
FIG. 1 shows a schematic overview of a robotic work tool according to one embodiment of the teachings of this application.

FIG. 1 shows a schematic overview of a robotic work tool 100 having a body 140 and a plurality of wheels 130. In the exemplary embodiment of FIG. 1 the robotic work tool 100 has 4 wheels 130, two front wheels 130' and the rear wheels 130". At least some of the wheels 130 are drivably connected to at least one electric motor 150. It should be noted that even if the description herein is focussed on electric motors, combustion engines may alternatively or additionally be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic work tool 100. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic work tool 100 further may have at least one sensor 170, in the example of FIG. 1 there are two sensors 170, arranged to detect a magnetic field (not shown). The sensors are connected to the controller 110 and the controller 110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic work tool 100 is inside or outside an area enclosed by a boundary wire.

It should be noted that the teachings herein may also be used for a robotic work tool 100 that is configured to operate in a work area, where the work area is not bounded by a boundary wire. Examples of such robotic work tools 100 are tools arranged to physically detect a boundary by collision detection, or a robotic work tool 100 that uses a position determination system (such as GNSS) to maintain a position within the work area, which work area is specified by coordinates.

The controller 110 is connected to the motors 150 for controlling the propulsion of the robotic work tool 100 which enables the robotic work tool 100 to service an enclosed area without leaving the area.

The robotic work tool 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller 110 is also configured to determine the load exerted on the rotating blade, by for example measure the power delivered to the cutter motor 165 or by measuring the axle torque exerted by the rotating blade. The robotic work tool 100 is, in one embodiment, a lawnmower robot. In one embodiment the robotic work tool 100 is a farming equipment. In one embodiment the robotic work tool 100 is a golf ball collecting tool.

The robotic work tool 100 may also be a vacuum cleaner, a floor cleaner, a street sweeper, a snow removal tool, a mine clearance robot or any other robotic work tool that is required to operate in a work area in a methodical and systematic or position oriented manner.

The robotic work tool 100 also has (at least) one battery 180 for providing power to the motors 150 and the cutter motor 165. Alternatively or additionally the robotic work tool may have a fuel tank 180 for supplying fuel to any other type of engine 150.

The robotic work tool 100 also comprises a collision detection sensor 190, which is also configured to detect a lifting event, that is to detect that the robotic work tool is being (at least partially) lifted. The collision detection sensor 190 and its arrangement in the robotic work tool 100 will be described in further detail with reference to FIG. 3.

Figure 2:
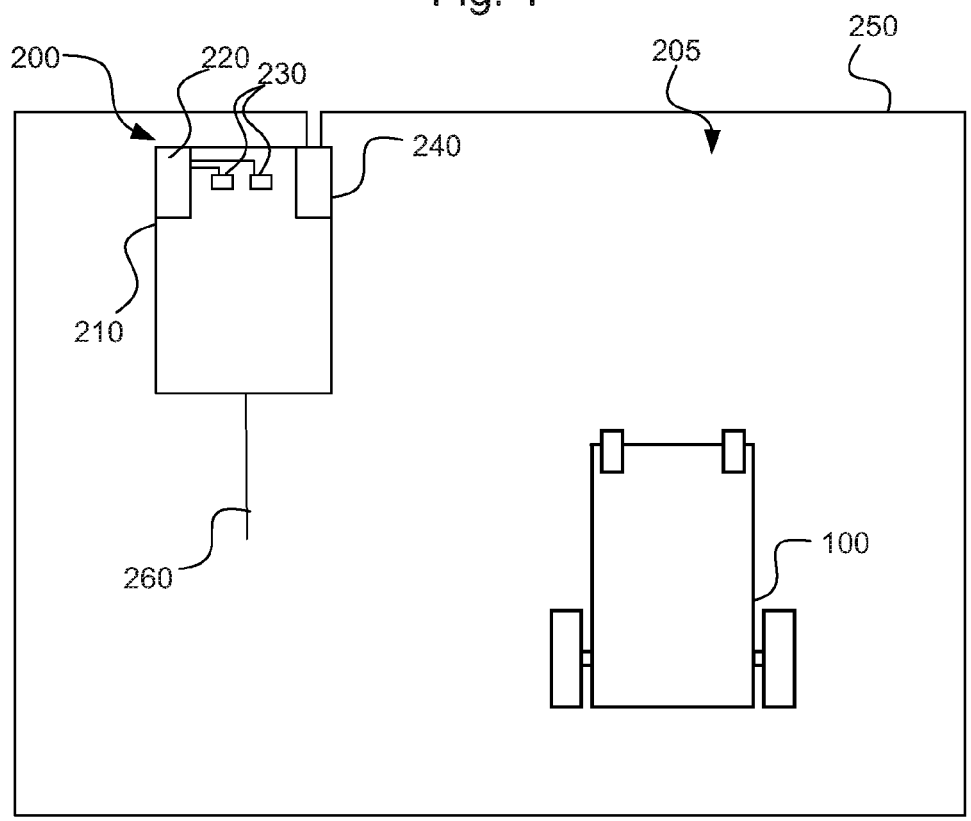
FIG. 2 shows a schematic view of a robotic working tool system according to one embodiment of the teachings of this application.

FIG. 2 shows a schematic view of a robotic work tool system 200 comprising a charging station 210 and a boundary wire 250 arranged to enclose a working area 205, the working area 205 not necessarily being a part of the robotic work tool system 200, in which the robotic work tool 100 is supposed to service. As stated above, the robotic work tool 100 may be arranged to operate solely using the position determining device in which case no boundary wire 250 nor signal generator (to be disclosed) is part of the robotic work tool system 200. The charging station 210 has a charger 220 coupled to, in this embodiment, two charging plates 230. The charging plates 230 are arranged to co-operate with corresponding charging plates (not shown) of the robotic work tool 100 for charging the battery 180 of the robotic work tool 100. The charging station 210 also has, or may be coupled to, a signal generator 240 for providing a control signal (not shown) to be transmitted through the boundary wire 250. Optionally, the charging station 210 also has a guide cable 260 for enabling the robotic work tool to find the entrance of the charging station 210.

Figure 3:
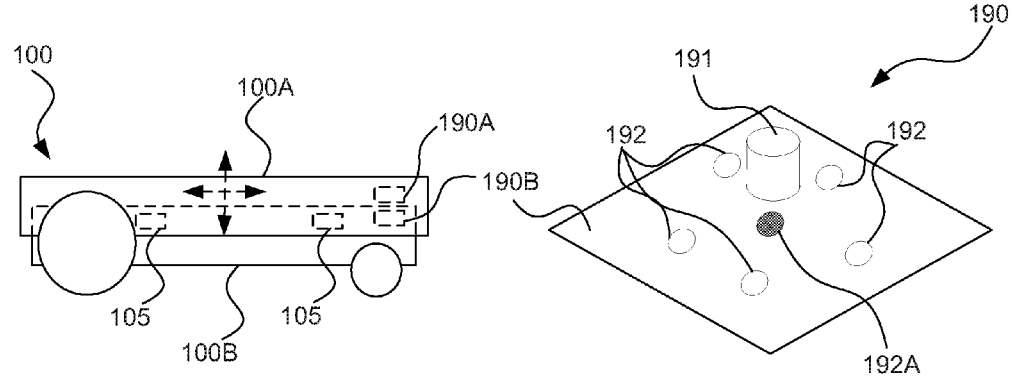
FIG. 3 shows a schematic view of a robotic work tool arranged with a collision detection sensor 190 according to one embodiment of the teachings of this application.

FIG. 3 shows a schematic view of a robotic work tool 100 arranged with a collision detection sensor 190 according to the teachings herein. As can be seen the robotic work tool 100 further comprises a body 100A and a chassis 100B. The body 100A is arranged to be removably attached to the chassis 100B. The body 100A is further arranged to be movable with respect to the chassis 100B as is illustrated by the dashed arrow in FIG. 3. The body 100A may be attached to the chassis 100B by means of elastic fittings 105, such as rubber bushings. Such an arrangement also reduces the wear and tear of the robotic work tool 100 as the elastic fittings will absorb some of the collision forces.

The body 100A is movable both in a direction in a same plane as a direction of movement of the robotic work tool 100 as well as in a direction perpendicular to such a plane. In other words, the body 100A is movable both in a forwards/backwards/left/right direction as well as in an up/down direction. The body 100A should at least be movable in an up direction in addition to the movement in the same plane as the direction of movement of the robotic work tool.

This enables the body 100A to move relative the chassis 100B both when a collision occurs, and when the robotic work tool is (at least partially) lifted. As a user lifts the robotic work tool 100, he will most likely do so by grabbing the body 100A and lift. The body 100A will therefore move up from the chassis 100B initially before the elastic fittings are stretched enough to lift the chassis 100B.

The collision detection sensor 190 is arranged between the body 100A and the chassis 100B. In FIG. 3, the collision detection sensor is shown as comprising a first part 190A and a second part 190B. In FIG. 3 the first part 190A is shown as the upper part 190A, and the second part 190B is shown as a lower part 190B. The upper part 190A is attached to the body 100A and the lower part is attached to the chassis 100B. A movement of the body 100A relative the chassis 100B will thus be translated to a movement of the upper part 190A of the collision detection sensor 190 relative the lower part 190B of the collision detection sensor 190.

Figures 4A, 4B, 4C:
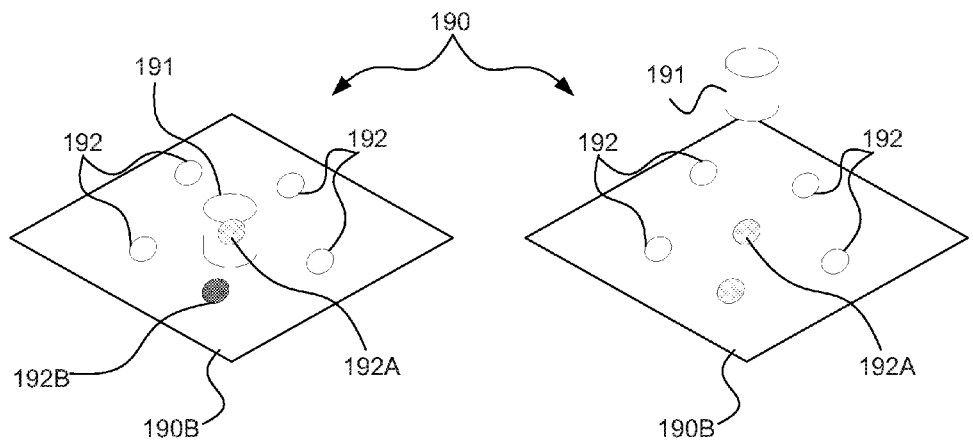
FIGS. 4A, 4B and 4C each shows a schematic view of a collision detection sensor according to one embodiment of the teachings of this application.

FIG. 4A shows a schematic view of a collision detection sensor 190 according to one embodiment of the teachings of this application. It should be noted that the upper part 190A is not shown as such in FIG. 4A but is represented by a first sensor element 191. In one embodiment the first sensor element 191 is a magnet.

The lower part 190B is arranged with a plurality of second sensor elements 192. The plurality of second sensor elements 192 is arranged in an array, a sensor element array. In one embodiment each second sensor element 192 is a magnetic sensor such as a Hall sensor.

As can be seen in FIG. 4A, the plurality of second sensor elements 192 are arranged so that there is one central second sensor element 192A and several peripheral second sensor elements 192, which are arranged at a substantially equal distance to the central second sensor element 192A.

In the example situation illustrated in FIG. 4A, the robotic work tool 100 is operating under normal conditions the magnet 191 is proximate to a central second sensor element 192A in the array of second sensor elements. The central second sensor element 192A is thus able to sense the magnet 191, which is indicated by the central second sensor element being marked as shadowed in FIG. 4A.

In this application the term being proximate indicates that the first sensor element (the magnet) is close enough to a second sensor element (the Hall sensor) to be sensed.

FIG. 4B shows a schematic view of the collision detection sensor 190 during a collision. As the body 100A is movable relative the chassis 100B, the body 100A will move slightly during the collision. As has been explained above, this results in a movement of the upper part 100A relative the lower part 190B of the collision detection sensor 190. This is in turn causes the magnet 191 to move relative the array of second sensor elements 192. In the example of FIG. 4B the magnet 191 is no longer proximate the center second sensor element 192A, but is proximate a peripheral second sensor element 192B. The peripheral second sensor element 192B is indicated to be active by being shadowed in FIG. 4B. It should be noted that depending on the force of the collision, the magnet 191 may still be proximate the center second sensor element 192A.

The controller of the robotic work tool 100 is thus configured to determine that a collision has been detected by detecting that the first sensor element 191 is proximate to a peripheral second sensor element 192. The controller 110 is also configured to change a direction of movement for the robotic work tool 100 in response to detecting the collision. The robotic work tool 100 can thus continue operating away from or around an obstacle that the robotic work tool 100 has collided with.

It should be noted that this arrangement is capable of detecting collisions in different directions and it is possible to achieve a satisfactory collision detection using only one collision detection sensor 190 adapted according to the teachings herein.

It should further be noted that the robotic work tool 100 can detect at which side the collision occurred, by determining which of the peripheral second sensor elements 192 that is proximate the magnet 191. If a peripheral second element sensor 192 on a left side is proximate the magnet 191, the collision occurred on a right side of the robotic work tool 100. Similarly the robotic work tool can determine if the collision is at a front side, a rear side or a left side.

Furthermore, depending on the arrangement of the plurality of second sensor elements 192, the robotic work tool 100 can also determine if the collision occurred at a corner.

The robotic work tool may be further configured to detect that the first sensor element 191 is proximate more than one peripheral second sensor element 192 and in response thereto, determine a collision side based on the combination of peripheral second sensor elements 192 being proximate the first sensor element 191.

FIG. 4C shows a schematic view of the collision detection sensor 190 during a lifting event. As a user lifts the robotic work tool 100, he most likely grabs the body 100A, possibly in a handle (not shown). The lifting thus result in a movement of the body 100A up and away from the chassis 100B, at least in one end of the robotic work tool 100 in the case of a partial lift. As the body 100A moves away from the chassis 100B, the upper part 190A of the collision detection sensor 190 will move up and away from the lower part 190B of the collision detection sensor 190. This results in a movement of the first sensor element 191 away from the array of second sensor elements 192. At one point during the lift, the first sensor element 191 will not be proximate any of the second sensor elements 192, which is indicated in FIG. 4C by none of the second sensor elements 192 being shadowed.

The controller 110 is thus configured to determine that the robotic work tool 100 is being lifted (at least partially) by detecting that the first sensor element 191 is not proximate any of the second sensor elements 192.

The controller 110 is also configured to discontinue any operation in response to detecting that the robotic work tool 100 is being lifted. In one embodiment the controller 110 is configured to deactivate or stop the work tool 160 to safe guard against any damages or injuries occurring during the lift.

By ensuring that one collision detection sensor 190 is arranged at the front end and the rear end of the robotic work tool 100 the controller can detect a (partial) lift in either end. In one embodiment the robotic work tool 100 is arranged with four collision detection sensors 190, one adjacent each corner of the robotic work tool 100, for detecting partial lifts close to a corner.

The distance between second sensor elements 192 as well as the distance from the first sensor element 191 to the second sensor elements 192 depends on size of robotic work tool 100, as well as the freedom to move of the body 100A respectively the upper part 190A of the collision detection sensor 190, and the strength of the magnets.

Although the FIGS. 4A, 4B and 4C show a collision detection sensor 190 to have 6 second sensor elements 192, it is also possible to implement a collision detection sensor 190 according to herein with other numbers of second sensor elements 192, and also in other arrangements. The number of and arrangements of the second sensor elements 192 may be chosen by a robotic work tool designer based on the size of the robotic work tool, the strength of the magnet and the sensitivity of the sensors, as well as the freedom to move of the body 100A respectively the upper part 190A of the collision detection sensor 190.

In the embodiment of FIGS. 3 and 4, there are six second sensor elements 192 in the array. The second sensor elements 192 are Hall sensors, digital and/or analogue, and the magnet may be a ferrite magnets and/or neodyne magnets. The second sensor element 192 may alternatively be an inductive sensor and the magnet is in such an embodiment replaced by a material having inductive characteristics that can be sensed by the inductive sensor.

It should be noted that the array of second sensor elements 192 may be arranged in the upper part 190A and the first sensor element 191 being arranged in the lower part 190B.

It should also be noted that even though the description herein will focus on the first sensor element 191 being a magnet and the second sensor element 192 being a magnetic sensor, such as a Hall sensor, the first sensor element 191 may be a magnetic sensor, such as a Hall sensor, and the second sensor elements 192 may be magnets. In such an embodiment the Hall sensor may be an analogue sensor and the controller is configured for detecting a dip in the magnetic field strength sensed by the Hall sensor. If the dip is short in time, but high in amplitude change, the controller may determine that a collision has occurred. If the dip is long in time, the controller may determine that a lift has occurred.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool system comprising a robotic work tool comprising a collision detection sensor, said collision detection sensor comprising a first sensor element and a plurality of second sensor elements, wherein said first sensor element is movably arranged with respect to said plurality of second sensor elements, wherein said robotic work tool is configured to
    detect that said first sensor element is proximate a peripheral second sensor element and in response thereto determine that a collision has been detected, and
    detect that said first sensor element is not proximate any second sensor element and in response thereto determine that a lift has been detected.

2. The robotic work tool system according to claim 1, wherein the robotic work tool further comprises a body and a chassis, wherein said body is attached to said chassis via elastic fittings.

3. The robotic work tool system according to claim 2, wherein said body is movable both in a direction in a same plane as a direction of movement of the robotic work tool as well as in a direction perpendicular to the same plane.

4. The robotic work tool system according to claim 1, wherein the first sensor element is a magnet and wherein at least one of the plurality of second sensor elements is a hall sensor.

5. The robotic work tool system according to claim 2, wherein said first sensor element is arranged in said body and said plurality of second sensor elements is arranged in said chassis.

6. The robotic work tool system according to claim 4, wherein said first sensor element is arranged in said chassis and said plurality of second sensor elements is arranged in said body.

7. The robotic work tool system according to claim 1, wherein the robotic work tool comprises only one collision detection sensor.

8. The robotic work tool system according to claim 1, wherein said robotic work tool is further configured to detect at which side the collision occurred, by determining which of the peripheral second sensor elements that is proximate the first sensor element.

9. The robotic work tool system according to claim 8, wherein said robotic work tool is further configured to detect that the first sensor element is proximate more than one peripheral second sensor element and in response thereto, determine a collision side based on the combination of peripheral second sensor elements being proximate the first sensor element.

10. The robotic work tool system according to claim 1, wherein said plurality of second sensor elements are arranged so that there is one central second sensor element and at least one peripheral second sensor element, which are arranged at a substantially equal distance to the central second sensor element.

11. The robotic work tool system according to claim 1, wherein the robotic work tool is a robotic lawnmower.

12. The robotic work tool system according to claim 1, wherein the robotic work tool is a farming equipment, a vacuum cleaner, a floor cleaner, a street sweeper, a snow removal tool, a golf ball retriever robot, a cleaner robot, a leaves blower robot, a leaves collector robot, snow thrower robot or a mine clearance robot.

13. A method for use in a robotic work tool system comprising a robotic work tool comprising a collision detection sensor, said collision detection sensor comprising a first sensor element and a plurality of second sensor elements, wherein said first sensor element is movably arranged with respect to said plurality of second sensor elements, wherein said method comprises detecting that said first sensor element is proximate a peripheral second sensor element and in response thereto determining that a collision has been detected, and detecting that said first sensor element is not proximate any second sensor element and in response thereto determining that a lift has been detected.

* * * * *